United States Patent [19]

Buchwald et al.

[11] Patent Number: 5,087,285
[45] Date of Patent: Feb. 11, 1992

[54] DICHLOROMONOFLUOROETHANE COMPOSITIONS

[75] Inventors: Hans Buchwald, Ronnenberg; Boleslaus Raschkowski, Wiedensahl, both of Fed. Rep. of Germany

[73] Assignee: Kali-Chemie AG, Hanover, Fed. Rep. of Germany

[21] Appl. No.: 481,151

[22] Filed: Feb. 20, 1990

[30] Foreign Application Priority Data

Feb. 20, 1989 [DE] Fed. Rep. of Germany ....... 3905125

[51] Int. Cl.$^5$ ................................................ B28B 7/36
[52] U.S. Cl. .................................. 106/38.22; 106/311; 252/171
[58] Field of Search ............................... 252/165, 171; 106/38.22, 271, 287.13, 243, 311

[56] References Cited

U.S. PATENT DOCUMENTS

| 4,028,120 | 6/1977 | Emond | 106/38.24 |
| 4,431,557 | 2/1984 | Shimizu et al. | 252/52 |
| 4,659,493 | 4/1987 | Fiest et al. | 252/54.6 |
| 4,746,463 | 5/1988 | Feist et al. | 260/410.9 |
| 4,894,176 | 1/1990 | Swan et al. | 252/171 |
| 4,995,908 | 2/1991 | Buchwald et al. | 106/311 |

FOREIGN PATENT DOCUMENTS

| 1248131 | 1/1989 | Canada . |
| 2552236 | 7/1976 | Fed. Rep. of Germany . |
| 3335870 | 4/1985 | Fed. Rep. of Germany . |

OTHER PUBLICATIONS

CA107(20):178718f, Morishima et al, 1987.
Handbook of Chemistry and Physics, 55th Edition, p. C-753.

Primary Examiner—Mark L. Bell
Assistant Examiner—Deborah Jones
Attorney, Agent, or Firm—Foley & Lardner

[57] ABSTRACT

Liquid compositions having release effective properties, which contain dichloromonofluoroethanes as a solvent and at least one agent with release effective properties, and the use of these compositions and a process for their preparation are described.

15 Claims, No Drawings

DICHLOROMONOFLUOROETHANE COMPOSITIONS

BACKGROUND OF THE INVENTION

The present invention relates to liquid compositions which contain a dichloromonofluoroethane as a solvent and at least one agent with release effective properties, to the use of such compositions, and to a process for their preparation.

Today, in many areas of industry which involve working steps such as casting, molding, pressing etc.,—for instance in the production and processing of plastics, foamed materials, building materials, rubber articles, tires, metals, glasses, ceramic products, etc.—release agents, lubricants or parting agents are required. The term "release agents" refers to solid or liquid films which reduce the adhesive forces between two adjoining surfaces, i.e. prevent them from sticking together. "Lubricants" are additives for plastic compositions, such as press molding compositions and injection molding compositions. They are needed to make the fillers slide more easily and hence to make the molding compositions easier to deform. The release agents, lubricants and parting agents contain release effective constituents, for instance in the form of dry powders, dry films or wet films, pastes, burnt-in films, solutions or dispersions. One special form is represented by the so-called internal release agents, which are mixed into material to be removed from a mold and which either become enriched on the surface or cause more rapid curing of the surface, so that no bonding occurs between the mold wall and molded article.

In many cases, in the above working steps the residues of the agent with release effective properties must be removed from the mold from time to time by means of solvents. Usually solvents such as hydrocarbons and chlorohydrocarbons are used to clean the molds, the former constituting a fire risk, and the latter causing skin irritations.

According to a process disclosed in U.S. Pat. No. 4,028,120, a mold release agent for the production of molded rubber products and the molding of foamed polyurethane materials is known. The mold release composition used therein contains paraffin wax, lamp oil and sodium soaps of tall oil acids in a paraffinic base oil. The mold release agent used must be soluble or emulsifiable in water in order to enable the mold release agent to be removed from the molded product by spraying or washing with warm water.

In U.S. Pat. No. 4,746,463 (=DE-OS 33 35 870), the preparation of special wax derivatives is described which can be used, for instance, as constituents of release agents, but in particular as cooling lubricants, whereby the fluorochlorohydrocarbons: trichloromonofluoromethane, 1,1,2-trichloro-1,2,2-trifluoroethane, 1,1,2,2-tetrachlorodifluoroethane, tetrachloromonofluoroethane and/or trichlorodifluoroethane are listed as suitable solvents.

SUMMARY OF THE INVENTION

The object of the invention is to provide new, improved liquid compositions of agents with release effective properties.

A further object of the invention is to provide new release effective, liquid compositions which permit economical use.

Another object of the invention is to provide release effective, liquid compositions which can be used in molds without frequent cleaning of the molds.

It is also an object of the invention to provide release effective, liquid compositions containing solvent constituents which have increased solvent power.

These and other objects of the invention are achieved by providing a liquid composition comprising a hydrogen-containing fluorochlorohydrocarbon solvent selected from the group consisting of the isomeric dichloromonofluoroethanes, and from 0.1 to 80% by weight relative to the total weight of the composition of an agent with release effective properties.

DETAILED DESCRIPTION OF PREFERRED EMBODIMENTS

The present invention provides liquid compositions having improved properties and containing a solvent and at least one agent with release effective properties, at least one of the isomers of dichloromonofluoroethane being contained therein as the solvent, and the agent with release effective properties being present in a quantity of 0.1 to 80% by weight, preferably 0.1 to 35% by weight, relative to the total mixture.

The isomers 1,2-dichloro-1-fluoroethane (R141), 1,1-dichloro-2-fluoroethane (R141a) or 1,1-dichloro-1-fluoroethane (R141b) may be present, individually or in combination, in any desired mixture as dichloromonofluoroethane within the scope of the invention. However, 1,1-dichloro-1-fluoroethane (R141b) is preferably used. The dichloromonofluoroethane isomers may also be contained in compositions according to the invention in the form of an azeotrope with other solvents—for instance with fluorochlorohydrocarbons, fluorohydrocarbons, chlorohydrocarbons, hydrocarbons, alcohols, ethers etc.

The compositions according to the invention are further characterized in that the agent with release effective properties is selected from the group consisting of waxes, wax derivatives, silicones, metal soaps, fats, oils, polymers, fluorocarbons, and inorganic powders. Preferably the agent with release effective properties is selected from the group consisting of waxes, wax derivatives, metal soaps and silicones.

In one embodiment, natural waxes of animal or vegetable origin, preferably natural waxes having a softening point of at least 40° C., are used as waxes within the scope of the invention.

In another embodiment of the invention, the waxes are unsaturated long-chain esters of carboxylic acids with monoalcohols having a total of 34 to 50 carbon atoms. In this case, fatty acid esters which have an iodine value of less than 95, preferably from 30 to 95, and particularly preferably from 75 to 95, are preferred. Mixtures of such fatty acid esters are commercially available and are described, for instance, in the Handbook of Chemistry and Physics, 55th edition, page C-753.

In another embodiment the wax derivatives are derivatives which are obtained by sulfochlorination, sulfidation or hydrogen fluoride treatment of unsaturated long-chain esters of carboxylic acids with monoalcohols having a total of 34 to 50 carbon atoms. The derivatives obtained by hydrogen fluoride treatment include, for example, the fluorine-containing, wax-like masses described in U.S. Pat. No. 4,746,463, the fluorine content of which is variable over a wide range. The fluorine content of these adducts of hydrogen fluoride with these unsaturated long-chain esters is, for instance, in the range from 0.1 to 4.3% by weight.

A completely different type of derivative of the long-chain unsaturated esters which can be obtained by hydrogen fluoride treatment is oily products (hereinafter sesquimers) which have from 1.1 to 1.9 times the mole weight compared with the starting wax and have an unreacted wax content of less than 1% by weight. These wax derivatives contain very little, if any, amounts of bound fluorine. As a rule, the fluorine content is less than 0.1% by weight and the iodine value ranges from 5 to 20.

Other wax derivatives, for instance derivatives obtained by hydrogenation of unsaturated long-chain esters of carboxylic acids with monoalcohols having a total of 34 to 50 carbon atoms and which are then partially saturated or completely saturated, may be used. As used herein, the term "partially saturated derivatives" refers to derivatives which have an iodine value which is less than that of educt used in the hydrogenation.

Other waxes which are useful in the present invention include synthetic waxes, preferably paraffin waxes or polyethylene waxes. In one embodiment, for instance, an oxidized polyethylene wax having an average molecular weight of 3700 to 4500 (viscosimetric), an acid number of 20 to 30, and a melting point of 89 to 99° C. is used.

Silicones are contained in another type of the compositions according to the invention. The silicones used may be in the form of oils, fats or resins. The silicones may be used as such or in the form of silicone oil emulsions or silicone pastes which contain a consistency modifier, for instance highly dispersed silicic acid, incorporated into the silicone oil.

Silicon fats usually contain metal soaps as consistency-modifying components. The silicone products used in the present invention are commercially available products.

Another embodiment of the invention is characterized in that the compositions contain metal soaps, for instance fatty acid salts of the metals magnesium, calcium, zinc, aluminum or lead. Optionally, the metal salts of stearic acid are used, in which case magnesium stearate is preferred.

Another embodiment of compositions within the scope of the invention contains inorganic powders, preferably graphite, talc or mica.

Other conventional agents with release effective properties such as oils, for instance mineral and ester oils, may also be used in compositions according to the invention. Further suitable agents effective as release agents include polymers, for instance polymeric alcohols (polyethylene glycol), polyamides or polyolefins.

In a modification of the invention, conventional solubilizers for the release effective agent are added to the compositions. Suitable solubilizers include, for example, known toxicologically acceptable solvents having solubilizing properties. Such solubilizers may be present in quantities of 1 to 80% by weight, preferably 10 to 30% by weight, relative to the total weight of the mixture. One embodiment of this modification of the invention is characterized in that aliphatic hydrocarbons, preferably petroleum fractions having a boiling range of for instance 100 to 140° C., are used as solubilizers. Other known solubilizers may also be used.

In the compositions according to the invention, up to 1% by weight of known corrosion inhibitors may additionally be added. Such corrosion inhibitors are commercially available for metals such as, for example, magnesium, aluminum, titanium, brass, bronze and steel. They are based in most cases on compositions which contain organic compounds with hetero atoms such as sulfur or particularly nitrogen. For instance, individual compounds or mixtures from the class of benzothiazoles, for instance mercaptobenzothiazole, benzimidazoles, for instance 2-phenylbenzimidazole, triazoles, for instance benzotriazoles, tolyltriazoles, oxazolines, for instance alkyl-substituted and/or hydroxyalkyl-substituted oxazolines, amides, amines, for instance tert. amines, have proved themselves. Furthermore, conventional stabilizers, particularly those for stabilizing dichloromonofluoroethanes, optionally may be added to the compositions according to the invention. Consistency-regulating additives may also be contained therein.

The compositions according to the invention are either solutions or dispersions, the term "dispersions" being understood to refer to emulsions as well as to suspensions.

The invention also comprises the use of the compositions as release agents, lubricants or parting agents, for instance in the production of plastics or foams, or in other fields of use.

Furthermore, the invention comprises the process for preparing the compositions according to the invention, wherein one or more agents with release effective properties in a quantity of 0.1 to 80% by weight, preferably 0.1 to 35% by weight, relative to the total composition, and optionally conventional solubilizers are incorporated into the solvent selected from the group of dichloromonofluoroethanes. Optionally, conventional solubilizers or other additives such as stabilizers or corrosion inhibitors may be added at the same time.

The compositions according to the invention containing dichloromonofluoroethanes as solvents have improved adhesion-reducing properties, high chemical indifference and good spreading capacity. Compared with conventional release agents in which hydrocarbons are used as solvents, the compositions according to the invention have a higher flash point. The preparation of the compositions according to the invention—in contrast to the preparation of release agents using, for instance, hydrocarbons as solvents—is particularly simple as a result of the very good solvent power of the dichloromonofluoroethanes. Often agents with especially good release effective properties are relatively difficult to dissolve in the solvents heretofore used in the prior art. Thus one advantage of the compositions according to the invention is that the unexpectedly high solvent power of the dichloromonofluoroethanes used as solvents also permits the preparation of such release effective compositions which all contain those agents with release effective properties which are difficult to dissolve per se. Furthermore, the use of the compositions according to the invention instead of conventional release agent compositions is more economical, since less release agent composition is consumed for the same application. Additional advantages manifest themselves during prolong use of the molds, for instance since the molds used need to be cleaned less frequently between the working steps.

The following examples are intended to illustrate the invention in further detail, but without limiting its scope.

EXAMPLE 1

A composition according to the invention was prepared from 5% by weight HF-wax adduct (known as "adducts" from U.S. Pat. No. 4,746,463) and 95% by weight 1,1-dichloro-1-fluoroethane (R141b). HF-wax adduct is understood to be a wax derivative which is obtained by hydrogen fluoride treatment of unsaturated long-chain esters of carboxylic acids with monoalcohols having a total of 34 to 50 carbon atoms, this derivative having hydrogen fluoride added to the double bonds of the educt. The preparation of this HF-wax adduct corresponds to Example 1 of U.S. Pat. No. 4,746,463.

The composition is a clear solution and has outstanding properties as a release agent.

EXAMPLES 2 to 14

The other Examples 2 to 14 of compositions according to the invention listed in the following table, which compositions also have outstanding release agent properties, were prepared analogously to Example 1. The amounts of the constituents are given in % by weight.

| Constituents of the Composition | 2 | 3 | 4 | 5 | 6 | 7 | 8 | 9 | 10 | 11 | 12 | 13 | 14 |
|---|---|---|---|---|---|---|---|---|---|---|---|---|---|
| 1,1-dichloro-1-monofluoroethane (R141b) | 90 | 92 | 80 | 50 | 90 | 20 | 85 | 90 | 95 | 80 | 20 | 80 | 20 |
| Sesquimer (HF-treated wax)* | 10 | | | | | | | | | | | | |
| Wax Ester (iodine value 85) | | 8 | | | | | | | | | | | |
| Silicone Oil (20,000 mm²/sec) | | | 4 | 35 | 10 | | | | | | | | |
| Paraffin (melting point 56-58° C.) | | | | | | 6 | 5 | 5 | 5 | | | | |
| Oxidized Polyethylene Wax (melting point 89-99° C.) | | | | | | | | | | 6 | 4 | 5 | |
| Polyethylene Wax (melting point 98-108° C.) | | | | | | | | | | | | | 7 |
| Magnesium Stearate | | | | | | | | | | | | 1 | |
| Petroleum Fraction (100-140° C.) | | | 16 | 15 | | 74 | 10 | 5 | | 14 | 76 | 14 | 73 |
| Type of Composition** | S | S | S | S | S | S | S | S*** | S*** | D | D | D | D |

*Prepared analogously to Examples 2 and 3 of U.S. Pat. No. 4,746,463.
**S = clear solution; D = dispersion.
***at 25° C.

What is claimed is:

1. A liquid composition with release effective properties comprising:
    a hydrogen-containing fluorochlorohydrocarbon solvent consisting essentially of dichloromonofluoroethane, and
    from 0.1 to 80% by weight relative to the total weight of the composition of an agent with release effective properties selected from the group consisting of waxes, wax derivatives, metal soaps, and silicones.

2. A liquid composition according to claim 1, wherein said fluorochlorohydrocarbon solvent is 1,1-dichloro-1-fluoroethane (R141b).

3. A liquid composition according to claim 1, wherein said agent with release effective properties comprises from 0.1 to 35% by weight relative to the weight of the composition.

4. A liquid composition according to claim 1, wherein said agent with release effective properties is a natural wax of animal or vegetable origin.

5. A liquid composition according to claim 4, wherein said natural wax has a softening point of at least 40° C.

6. A liquid composition according to claim 1, wherein said agent with release effective properties is a wax comprised of unsaturated long-chain esters of carboxylic acids with monoalcohols having a total of from 34 to 50 carbon atoms.

7. A liquid composition according to claim 1, wherein said agent with release effective properties is a wax derivative obtained by sulfochlorination, sulfidation or hydrogen fluoride treatment of unsaturated long-chain esters of carboxylic acids with monoalcohols having a total of from 34 to 50 carbon atoms.

8. A liquid composition according to claim 1, wherein said agent with release effective properties is a synthetic wax.

9. A liquid composition according to claim 8, wherein said agent with release effective properties is a synthetic wax is selected from the group consisting of paraffin wax and polyethylene wax.

10. A liquid composition according to claim 1, wherein said agent with release effective properties is a silicone selected from the group consisting of silicone oils, silicone fats, silicone resins, silicone pastes, and silicone oil emulsions.

11. A liquid composition according to claim 1, wherein said agent with release effective properties is a metal soap consisting of fatty acid salts of at least one metal selected from the group consisting of magnesium, calcium, zinc, aluminum, and lead.

12. A liquid composition according to claim 11, wherein said metal soap is a stearic acid salt.

13. A liquid composition according to claim 1, further comprising from 1 to 80% by weight relative to the total weight of the composition of a solubilizer for the release effective agent, wherein said solubilizer is an aliphatic hydrocarbon petroleum fraction having a boiling range of from 100 to 140° C.

14. A liquid composition according to claim 13, comprising from 10 to 30% by weight of said solubilizer relative to the total weight of the composition.

15. A process for preparing a release effective liquid composition comprising the steps of incorporating from 0.1 to 80% by weight of at least one agent with release effective properties selected from the group consisting of waxes, wax derivatives, metal soaps, and silicones and from 1 to 80% by weight of a solubilizing agent consisting of an aliphatic hydrocarbon petroleum fraction boiling in the range from 100 to 140° C. into the solvent dichloromonofluoroethane.

* * * * *